F. K. NEWELL.
SOAP CHIPPING DEVICE
APPLICATION FILED MAR. 29, 1922.
1,436,721.
Patented Nov. 28, 1922.
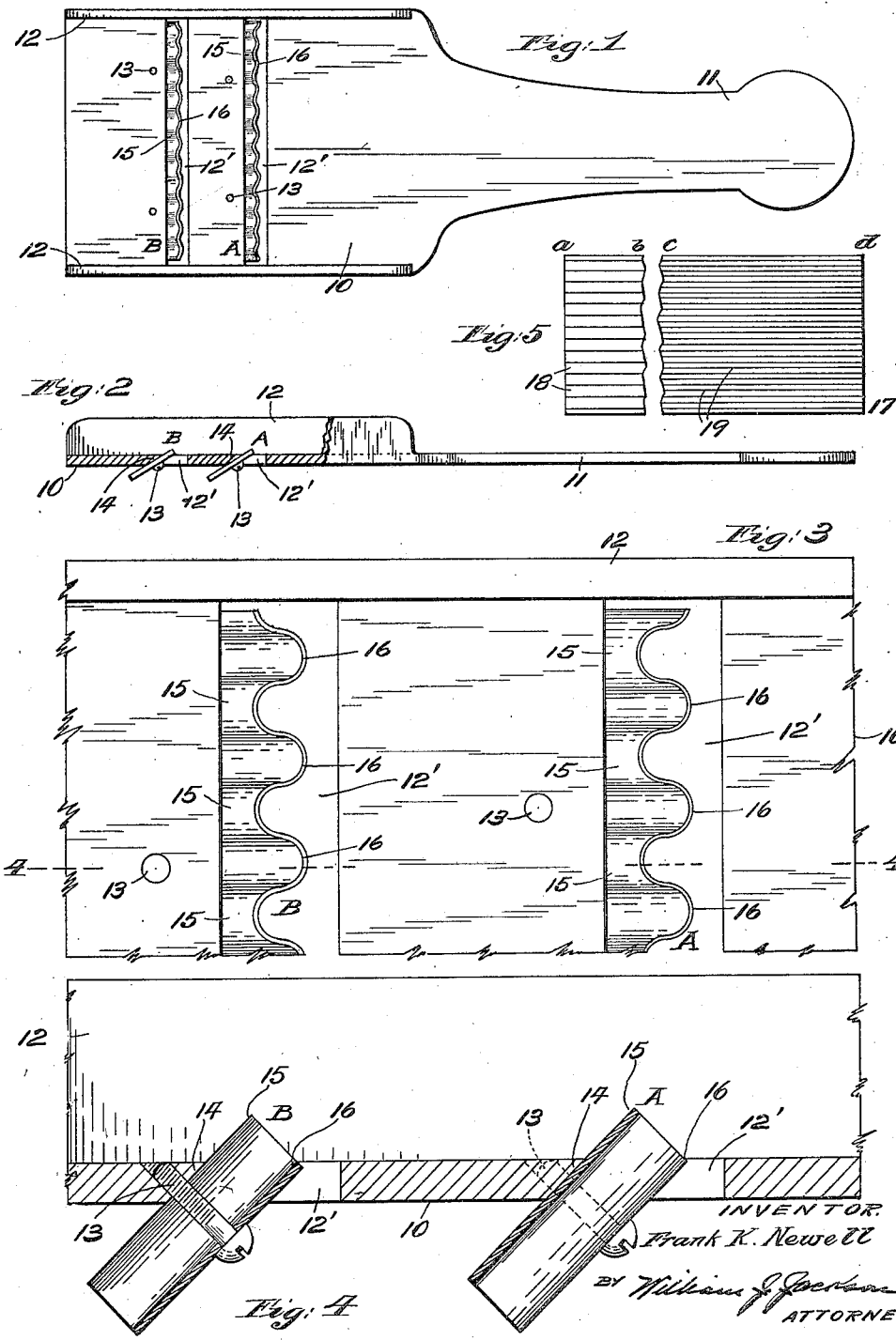

Patented Nov. 28, 1922.

1,436,721

UNITED STATES PATENT OFFICE.

FRANK K. NEWELL, OF PHILADELPHIA, PENNSYLVANIA.

SOAP-CHIPPING DEVICE.

Application filed March 29, 1922. Serial No. 547,691.

*To all whom it may concern:*

Be it known that I, FRANK K. NEWELL, a citizen of the United States, residing at the city of Philadelphia, county of Philadelphia, and State of Pennsylvania, have invented a certain new and useful Improved Soap-Chipping Device, of which the following is a specification.

This invention, generally stated, relates to so-called kitchen utensils and has more especial relation to a device for preparing soap-chips.

Soap-chips, as commonly used, are prepared in large quantities and sold in packages for household use. While soap-chips in package form provides a convenient form of distribution nevertheless it is expensive and more or less unsatisfactory to the user for the reason that the moisture content of the soap rapidly exudes thus causing the chips to dry out. According to the present invention the householder may take a cake of soap in its natural, moist condition and shave or chip off a desired quantity of chips for imdiate use thus deriving full benefit of moist soap-chips at little expense and no waste. Further small ends of soap which are generally discarded may be conveniently utilized for preparing chips.

The leading object of the present invention may be said to reside in the provision of a compact, simple, convenient and comparatively inexpensive device designed for household use whereby soap-chips may be expeditiously prepared for use as desired in moist form. Other and further objects not at this time more particularly specified will appear hereinafter.

The invention consists of the improvements hereinafter described and finally claimed.

The nature, characteristic features and scope of the invention will be more fully understood from the following description taken in connection with the accompanying drawings forming part hereof, and in which:

Fig. 1, is a top or plan view of a device embodying features of the present invention.

Fig. 2, is a side view thereof, partly sectioned.

Fig. 3, is a fragmentary view, in plan, drawn to an enlarged scale, illustrating details of cutter construction.

Fig. 4, is a view in section taken upon the line 4—4 of Fig. 3, and

Fig. 5, is a view of the underside of a cake of soap hereinafter more particularly referred to.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the drawings 10 designates the body portion and 11 the handle of a soap-chipper. These parts are horizontally arranged in a single plane and are flat throughout their extent. Disposed at right angles to body 11, upon opposite sides thereof are the vertical walls 12 so that cakes or bars of soap may be guided to the cutters about to be described. Adjacent the outer end of body 10 are parallel, laterally disposed slots 12', one wall of each slot being vertically disposed and the opposite wall thereof arranged at an inclination. Fitted within each slot in a fixed manner, as by screws 13, is a cutter. Each cutter comprises an elongated, thin metallic strip fluted or corrugated throughout its length as clearly shown in Fig. 1. The flutings are disposed in parallelism with the length of the device and the cutter as a whole is arranged at an inclination to the floor or device bottom. The angle of the cutters depends upon the walls 14 which are tapped to receive the screws 13. The fluted cutters are so arranged that the convexed portions 15 of one cutter are in staggered relation with the similar portions of the other cutter, see Fig. 3. To describe this arrangement otherwise, the convexed portions 15 of one cutter are in alignment with the concaved portions 16 of the opposite cutter. It will be noted that the concaved portions 16 are substantially flush with the device floor and that the convexed portions 15 are considerably thereabove, see Fig. 4. Thus the cutting edges of the convexed parts 15, which in practice may have a knife-edge, function to cut semicircular grooves in the surface of a cake or bar of soap as pushed along the floor of the device. The cutting of these grooves results in the providing of soap-chips of semi-circular diameter. Since the cutting edges of parts 15 are staggered the entire face of a piece of soap is evenly operated upon which would not be the case if a single cutter were employed or if two cutters with aligned cutting edges were employed. To illustrate this fact a cake of soap designated 17 is shown in Fig. 5 showing an initial cut. From the part *a* to the part *b* illustrates the first grooves 18 as cut by the portions 16 of cutter designated A. From the part *c* to the part *d* illustrates the appearance of the soap cake after it has been passed over both cutters A and B and an additional set of grooves 19 provided. Because of the two sets of cutters the semicircular, thin strips instead of egressing through the slots 12 in long lengths are either broken or cut off in short lengths which is advantageous. In passing a cake of soap through the device subsequently to the initial cut such parts of the soap face, between adjacent grooves, as remain intact are operated upon by at least some of the cutter parts so that such face is gradually and evenly cut down.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:—

1. In a device of the character stated a bed-portion having opposed delivery slots therein and a cutter fixed in each slot each cutter comprising a member the body of which is corrugated, the corrugations of one cutter having staggered relation with the corrugations of the opposed cutter.

2. In a device of the character stated a bed-portion having opposed delivery slots therein and a cutter fixed in each slot, the body portion of each cutter being corrugated with the corrugations of the respective cutters disposed in staggered relation, said cutters being bodily disposed in a plane intersecting the horizontal plane of said bed-portion.

3. In a device of the character stated a bed-portion having opposed delivery slots therein and a cutter fixed in each slot, the body portion of each cutter being corrugated with the corrugations of the respective cutters disposed in staggered relation, said cutters being bodily disposed in a plane intersecting the horizontal plane of said bed-portion with the convexed portions of said cutters extending an appreciable distance above the feeding surface of said bed-portion.

4. In a device of the character stated a bed-portion disposed in a single, fixed plane, said bed-portion being provided with opposed delivery slots, one wall of each slot being chamfered and a cutter within each slot and fixed to a chamfered wall in a plane intersecting the horizontal plane of said bed-portion, the body portion of each cutter being fluted or corrugated with the corrugations of the respective cutters disposed in staggered relation.

5. In a device of the character stated a bed-portion disposed in a single, fixed plane, said bed-portion being provided with opposed delivery slots, one wall of each slot being chamfered, a cutter within each slot abutting against said chamfered wall and disposed in a plane intersecting the horizontal plane of said bed-portion, the body portion of each cutter being corrugated with the corrugations of the respective cutters disposed in staggered relation and means passing through each cutter and engaging a chamfered wall for securing said cutters to place.

6. A soap-chipper of the character stated comprising a bed-portion provided with a plurality of delivery openings and a cutter for each opening the body of each of which cutters is corrugated with the corrugations of the respective cutters disposed in staggered relation.

In testimony whereof, I have hereunto signed my name.

FRANK K. NEWELL.